United States Patent
Patzelt et al.

(10) Patent No.: US 11,354,261 B2
(45) Date of Patent: Jun. 7, 2022

(54) PROCESS CONTROL SYSTEM

(71) Applicant: WAGO Verwaltungsgesellschaft mbH, Minden (DE)

(72) Inventors: Andreas Patzelt, Buende (DE); Christian Voss, Minden (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 0 days.

(21) Appl. No.: 16/793,673

(22) Filed: Feb. 18, 2020

(65) Prior Publication Data

US 2020/0183871 A1 Jun. 11, 2020

Related U.S. Application Data

(63) Continuation of application No. PCT/IB2018/000868, filed on Jul. 13, 2018.

(30) Foreign Application Priority Data

Aug. 18, 2017 (DE) .................... 10 2017 007 815.7

(51) Int. Cl.
*G06F 3/00* (2006.01)
*G06F 13/40* (2006.01)
(Continued)

(52) U.S. Cl.
CPC ..... *G06F 13/4027* (2013.01); *G05B 19/0428* (2013.01); *G06F 13/4282* (2013.01);
(Continued)

(58) Field of Classification Search
CPC .......................... G06F 13/4027; G06F 13/4282
See application file for complete search history.

(56) References Cited

U.S. PATENT DOCUMENTS 5,909,541 A * 6/1999 Sampson ............ G06F 11/1044
714/6.2
6,831,820 B2 12/2004 Schwesig et al.
(Continued)

FOREIGN PATENT DOCUMENTS

DE 10235502 C1 12/2003
DE 102006061063 A1 6/2007
(Continued)

OTHER PUBLICATIONS

Wikipedia.com, Serial Peripheral Interface Bus, Dec. 2016, p. 1-11 (Year: 2016).*
(Continued)

*Primary Examiner* — Henry Tsai
*Assistant Examiner* — Dean Phan
(74) *Attorney, Agent, or Firm* — Muncy, Geissler, Olds & Lowe, P.C.

(57) ABSTRACT

A system for controlling a process having a first control device for processing first data, and a first communication interface of a first communication unit designed for receiving the first data, and a second control device for processing second data, and a second communication interface of a second communication unit, designed for receiving the second data. The first communication unit comprises a third communication interface and the second communication unit comprises a fourth communication interface. The third communication interface is connected to the second communication interface and the first processor processes or compares the second data received by the third communication interface with the first data received by the first communication interface. The fourth communication interface is connected to the first communication interface, and the second processor processes or compares the second data
(Continued)

received by the second communication interface with the first data received by the fourth communication interface.

19 Claims, 4 Drawing Sheets

(51) Int. Cl.
*G05B 19/042* (2006.01)
*G06F 13/42* (2006.01)

(52) U.S. Cl.
CPC .............. *G05B 2219/24184* (2013.01); *G05B 2219/24189* (2013.01)

(56) References Cited

U.S. PATENT DOCUMENTS

| | | | |
|---|---|---|---|
| 7,613,108 B2 | 11/2009 | Takehara et al. | |
| 2003/0043938 A1* | 3/2003 | Masejnik | G06F 7/02 375/340 |
| 2008/0162835 A1* | 7/2008 | Wilson | G06F 3/04166 711/155 |
| 2013/0287143 A1* | 10/2013 | Davies | H04L 1/08 375/316 |
| 2014/0258474 A1* | 9/2014 | Kim | H04W 4/70 709/219 |

FOREIGN PATENT DOCUMENTS

| | | |
|---|---|---|
| DE | 102009027303 A1 | 12/2010 |
| EP | 1302826 A1 | 4/2003 |

OTHER PUBLICATIONS

International Standard ISO13849-1:2015(E) Safety of machinery—Safety-related parts of control systems.
International Search Report dated Oct. 29, 2018 in corresponding application PCT/IB2018/000868.

* cited by examiner

PROCESS CONTROL SYSTEM

PROCESS CONTROL SYSTEM

This nonprovisional application is a continuation of International Application No. PCT/IB2018/000868, which was filed on Jul. 13, 2018, and which claims priority to German Patent Application No. 10 2017 007 815.7, which was filed in Germany on Aug. 18, 2017, and which are both herein incorporated by reference.

BACKGROUND OF THE INVENTION

Field of the Invention

The present invention relates to a system and method for controlling a process.

Description of the Background Art

Control devices or their elements are often designed redundantly in safety-related systems, such as, for example, systems according to Category 4 of DIN EN ISO 13849. In order to achieve the required diagnostic coverage to detect possible errors, cross-communication for data synchronization must take place between the control devices.

The exchange of data via cross-communication is particularly necessary in control devices in which a safety-related protocol stack processes the input data and sends them to a higher-level safe controller. If data are processed by the same protocol stack in both control devices, the same data must be processed in order to be able to achieve the same results.

Deviating results can be detected either by the control devices themselves or by a higher-level control unit and usually lead to an installation, controlled by the control unit, being brought into a safe state. In this state, however, the installation can typically no longer fulfill its actual task.

Because the control devices never operate 100% synchronously, different read times, which can lead to different input data in the range of a few nanoseconds, can occur especially in the case of inputs. Furthermore, unavoidable tolerances in the input circuits can lead to different input data even with simultaneous sampling.

After reading, the input data are therefore often exchanged and synchronized via the cross-communication prior to further processing by the control devices (see, for example, the teaching of EP 1 302 826 A1). However, this takes up additional processor time and leads to an extended system response time.

SUMMARY OF THE INVENTION

In this regard, the invention enriches the prior art as the control devices receive the input data simultaneously in a system/method of the invention. This avoids the need to synchronize the input data via cross-communication.

In particular, the control devices read the input data stream of the respective other control device in addition to their own input data stream, which is achieved in that both control devices operate two interfaces in parallel. In this way, both control devices receive the same two-channel database without the need for cross-communication. Instead, the data synchronization between the two input data streams can take place immediately after the end of the data transmission in the memory of the two control devices. An additional transmission of the data via cross-communication before further processing by the safety-related protocol stack is therefore not necessary.

An exemplary system of the invention for controlling a process comprises a first control device, which comprises a first processor, designed for processing first data, and a first communication interface of a first communication unit, designed for receiving the first data. The system further comprises a second control device, which comprises a second processor, designed for processing second data, and a second communication interface of a second communication unit, designed for receiving the second data.

The first communication unit comprises a third communication interface and the second communication unit comprises a fourth communication interface, wherein the third communication interface is connected to the second communication interface and the first processor is designed to process, in particular to compare, the second data received by the third communication interface and the first data received by the first communication interface.

The fourth communication interface is connected to the first communication interface and the second processor is designed to process, in particular to compare, the second data received by the second communication interface and the first data received by the fourth communication interface.

The term "control device," as it is used in the description and claims, can be understood in particular to mean a microcontroller which is designed, for example, to control an installation or to be used as part of a system controller. Further, the term "communication interface," can be understood in particular to mean a hardware interface or network interface that is designed for connecting one or more wire lines.

Furthermore, the term "data," can be understood in particular to mean digital data derived from electrical signals. Furthermore, the term "processor," as it is used in the description and claims, is to be understood in particular to mean an electronic circuit which is designed to process data on the basis of instructions stored in a memory.

The processing by the first processor preferably comprises comparing the first data with the second data, and/or the processing by the first processor comprises forwarding the first data and/or the second data and/or a comparison result.

The processing by the second processor preferably comprises comparing the first data with the second data, and/or the processing by the second processor comprises forwarding the first data and/or the second data and/or a comparison result.

The first processor is preferably designed, if the second data received by the third communication interface match the first data received by the first communication interface, to determine the first output data on the basis of the received first data and/or the received second data, and the second processor is designed, if the second data received by the second communication interface match the first data received by the fourth communication interface, to determine the second output data on the basis of the received first data and/or the received second data.

The system can be designed to compare the first output data and the second output data and, if the first output data and the second output data match, to transmit the first output data and/or the second output data to a control unit or, if the first output data and the second output data do not match, to transmit to the control unit an error signal or third output data (in the case of analog values, for example, mean values, minimum values, maximum values, or also substitute values) determined from the non-matching first and second output data according to a logical or arithmetic operation.

The system can further comprise a control unit, wherein the first control device is designed to transmit the first output data to the control unit, and the second control device is designed to transmit the second output data to the control unit and the control unit is designed to compare the first output data and the second output data and to discard the first output data and the second output data if the first output data and the second output data do not match.

The first communication interface and the second communication interface can be designed as serial peripheral interface (SPI) master communication interfaces, and the third communication interface and the fourth communication interface are designed as SPI slave communication interfaces.

A method of the invention includes simultaneously transmitting first process signals to a serial peripheral interface (SPI) master communication interface of a first control device and to an SPI slave communication interface of a second control device, and simultaneously transmitting second process signals to an SPI master communication interface of the second control device and to an SPI slave communication interface of the first control device.

The method of the invention further comprises checking the received process signals for matching, in particular by the first control device, checking the received process signals for matching, in particular by the second control device, controlling the process based on the received process signals if a match between the received process signals was established, and transferring the process to a predetermined state if a match between the received process signals was not established.

The term "process signals," can be understood in particular to mean digital measurement data or status data which characterize the process.

Preferably, receiving the first process signals by the second control device comprises listening to the communication of the SPI master communication interface of the first control device by the SPI slave communication interface of the second control device, and receiving the second process signals by the first control device comprises listening to the communication of the SPI master communication interface of the second control device by the SPI slave communication interface of the first control device.

Preferably, transmitting the first process signals to the SPI slave communication interface of the second control device comprises modifying and in particular inverting the first process signals.

The method preferably further comprises checking, by the second control device, the modified first process signals and the second process signals for matching, and transferring the process to a predetermined state if the second control device establishes a match between the modified first process signals and the second process signals.

The method preferably further comprises deriving process data from the received process signals, determining control data, based on the process data, by the first control device and the second control device, performing a cross-comparison with respect to the control data of the first control device and the second control device, deriving control signals from the control data, and outputting the control signals.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
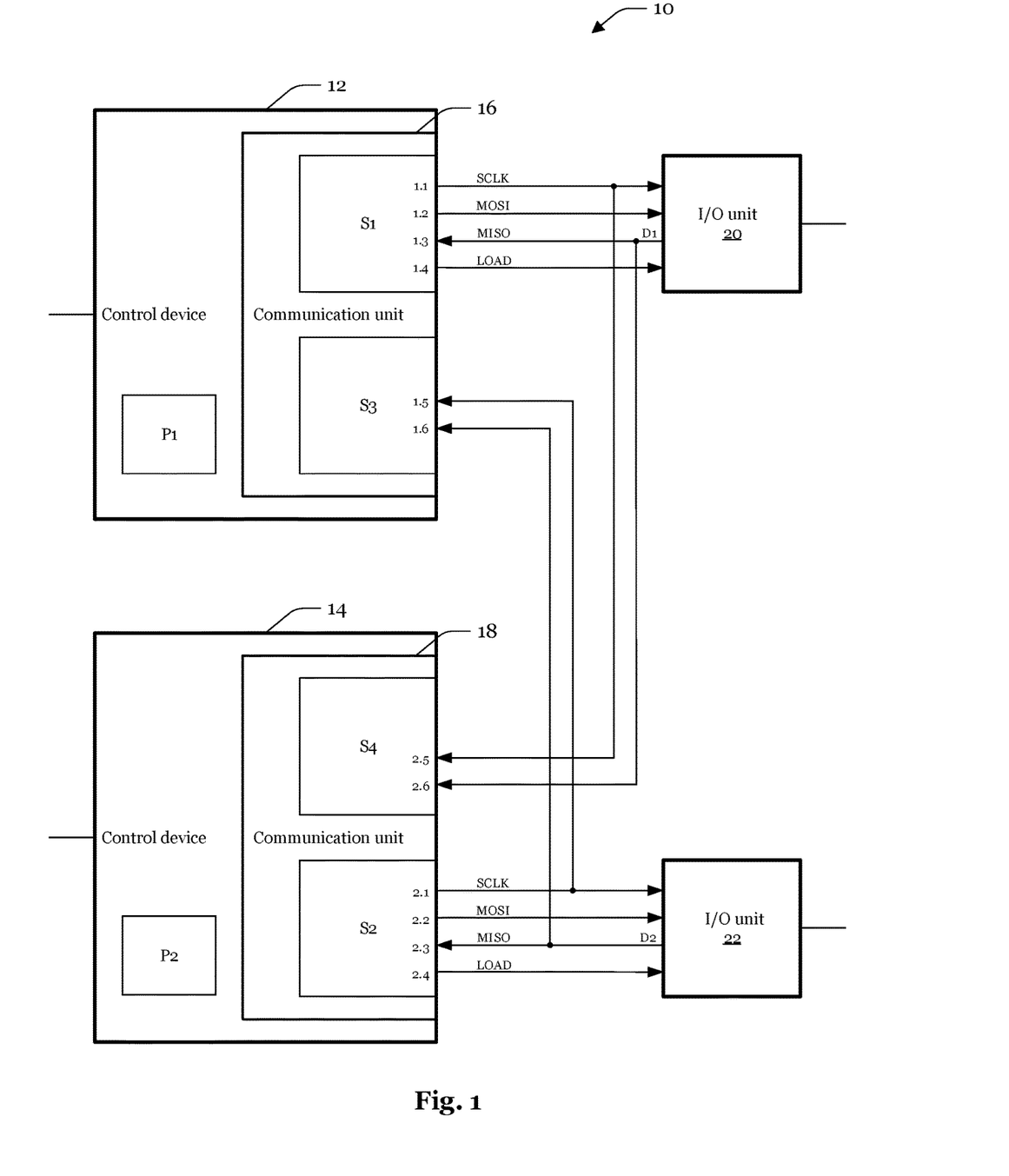
FIG. 1 shows a block diagram of an exemplary system.

FIG. 1 shows a block diagram of an exemplary system 10. System 10 comprises a first control device 12 and a second control device 14 (for example, a microcontroller). First control device 12 comprises a first processor P1 and a first communication unit 16, and second control device 14 comprises a second processor P2 and a second communication unit 18. In this case, first control device 12 and second control device 14 can have the same components.

Communication units 16, 18 each comprise two communication interfaces S1 and S3 or S2 and S4, respectively. First communication interface S1 is connected to a first I/O unit 20 and second communication interface S2 is connected to a second I/O unit 22. I/O units 20, 22 can be designed, for example, as (8-bit, 16-bit, 32-bit, etc.) I/O port expanders.

First communication interface S1 and second communication interface S2 can be designed as SPI master interfaces which control the reading of first and second data D1, D2 from SPI slave interfaces of I/O units 20, 22 based on the clock signal. I/O units 20, 22 can be designed to output the first and second data D1, D2 at a MISO output if a clock signal SCLK is present at a clock signal input of I/O units 20, 22.

Furthermore, the first data D1 and second data D2 can be based on a mutual database, so that first data D1 correspond to second data D2 when system 10 is functioning without errors. Thus, system 10 can be checked for errors by comparing first data D1 and second data D2, or by comparing data derived from first data D1 and second data D2.

In order to be able to make the second data D2 available to first communication unit 16 without a time delay, third communication interface S3 is connected to second communication interface S2. For example, third communication interface S3 can be designed as an SPI slave interface, wherein the MOSI (Master Out Slave In) input of third communication interface S3 is connected to the MISO (Master In Slave Out) input of second communication interface S2 or the MISO (Master In Slave Out) output of second I/O unit 22.

Likewise, in order to be able to make the first data D1 available to second communication unit 18 without a time delay, fourth communication interface S4 is connected to first communication interface S1. For example, fourth communication interface S4, like third communication interface S3, can be designed as an SPI slave interface, wherein the MOSI input of fourth communication interface S4 is connected to the MISO input of first communication interface S1 or the MISO output of first I/O unit 20.

Figure 2:
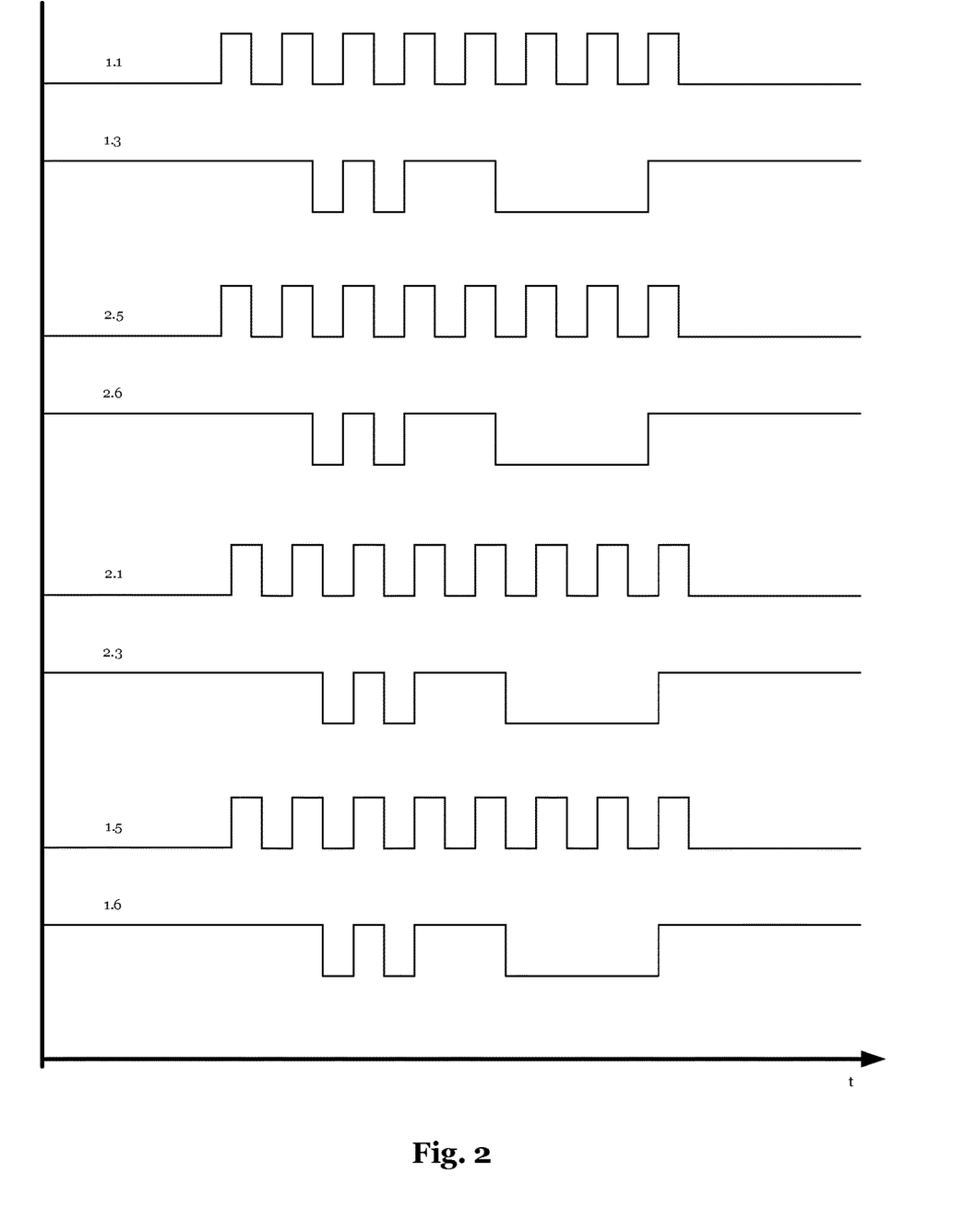
FIG. 2 shows an exemplary signal curve in the system of FIG. 1.

FIG. 2 shows an exemplary signal curve at the outputs/inputs of system 10. If a clock signal SCLK is output by first communication interface S1 (SPI master interface) at output 1.1, first I/O unit 20 outputs first data D1, which are read by first communication interface S1 via input 1.3 (MISO). First data D1 are also read by fourth communication interface S4 via input 2.6 (MOSI), because the clock signal SCLK generated by first communication interface S1 is present at input 2.5 of fourth communication interface S4 (SPI slave interface).

Likewise, if a clock signal SCLK is output by second communication interface S2 (SPI master interface) at output 2.1, second I/O unit 22 outputs second data D2, which are read by second communication interface S2 via input 2.3 (MISO). Second data D2 are also read by third communication interface S3 via input 1.6 (MOSI), because the clock signal SCLK generated by second communication interface S2 is present at input 1.5 of third communication interface S3 (SPI slave interface).

It does not matter if the clock signals SCLK of the first and second communication interfaces S1, S2 are not completely synchronous, because the data can be stored until the next transmission. Thus, only synchronization between communication interfaces S1 and S4 or S2 and S3 is required in order to correctly transmit the first and second data D1, D2 to first and fourth communication interfaces S1, S4 or second and third communication interfaces S2, S3. However, this is already achieved by the mutual clock lines.

First processor P1 is designed to process second data D2 received by third communication interface S3 and first data D1 received by first communication interface S1. The processing can include a comparison of first data D1 with second data D2 and the further processing can depend on the result of the comparison. For example, if the comparison of first data D1 with second data D2 shows that these are not identical, the further processing can be terminated and an error signal can be generated/output instead.

Likewise, second processor P2 is designed to process first data D1 received by fourth communication interface S4 and second data D2 received by second communication interface S2. The processing can include a comparison of second data D2 with first data D1 and the further processing can depend on the result of the comparison. For example, if the comparison of second data D2 with first data D1 shows that these are not identical, the further processing can be terminated and an error signal can be generated/output instead.

Figure 3:
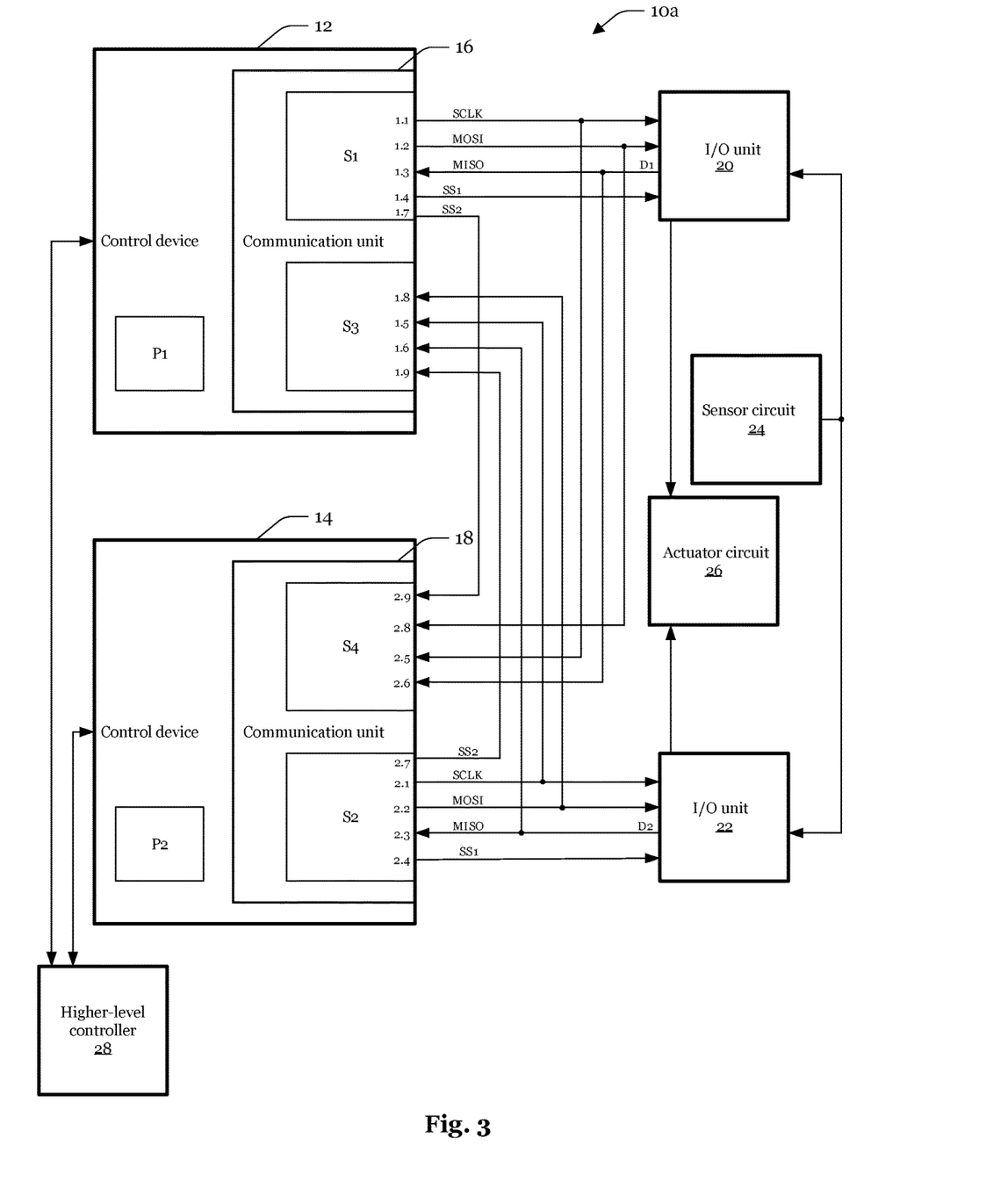
FIG. 3 is a block diagram of the exemplary system of FIG. 1 with further elements.

FIG. 3 shows a block diagram of the exemplary system 10 of FIG. 1 with further elements. System 10a shown in FIG. 3 thus comprises a sensor circuit 24, an actuator circuit 26, and a higher-level controller (control unit) 28. Sensor circuit 24, which can comprise one or more sensors, provides measured values that characterize the state of an installation. The measured values are transmitted to I/O units 20, 22, which transmit the measured values as first data D1 and second data D2 to communication interfaces S1, S4 and communication interfaces S2, S3. The measured values can be transmitted to I/O units 20, 22 in series or in parallel, wherein I/O units 20, 22 can comprise, for example, serial-to-parallel converters.

Processors P1, P2 of control devices 12, 14 compare the received data D1, D2 in order to detect measurement errors and/or transmission errors. If no error is found, control devices 12, 14 determine control signals or forward the received data D1, D2 to higher-order controller 28, which determines control data from received data D1, D2 and makes them available to control devices 12, 14. Control devices 12, 14 synchronize the determined control data by means of cross-communication of the control data or data derived from the control data.

The cross-communication can, as indicated in FIG. 3, be carried out via communication interfaces S1, S4 or communication interfaces S2, S3. For example, if communication interfaces S1, S2 are designed as SPI master interfaces, SPI slave interfaces S3, S4 can be addressed via the "slave select" outputs 1.7, 2.7, so that the data output at MOSI outputs 1.2, 2.2 can only be read at inputs 1.8, 2.8.

If the synchronization is successful, the control data or control signals derived from the control data can be transmitted to I/O units 20, 22, which transmit the control data/signals to actuator circuit 26 via MOSI outputs 1.2, 2.2 when I/O units 20, 22 are addressed accordingly by means of "slave select" outputs 1.4, 2.4. Actuator circuit 26 can comprise one or more actuators and control them on the basis of the received control data/signals, wherein the one or more actuators are used to control a state of the installation.

If, on the other hand, a measurement and/or transmission error is detected or the synchronization of the control data fails, one of the control devices 12, 14 or the higher-level controller 28 can generate/output an error signal. The error signal can, for example, cause actuator circuit 26 to bring system 10a or the installation into a safe state.

Figure 4:
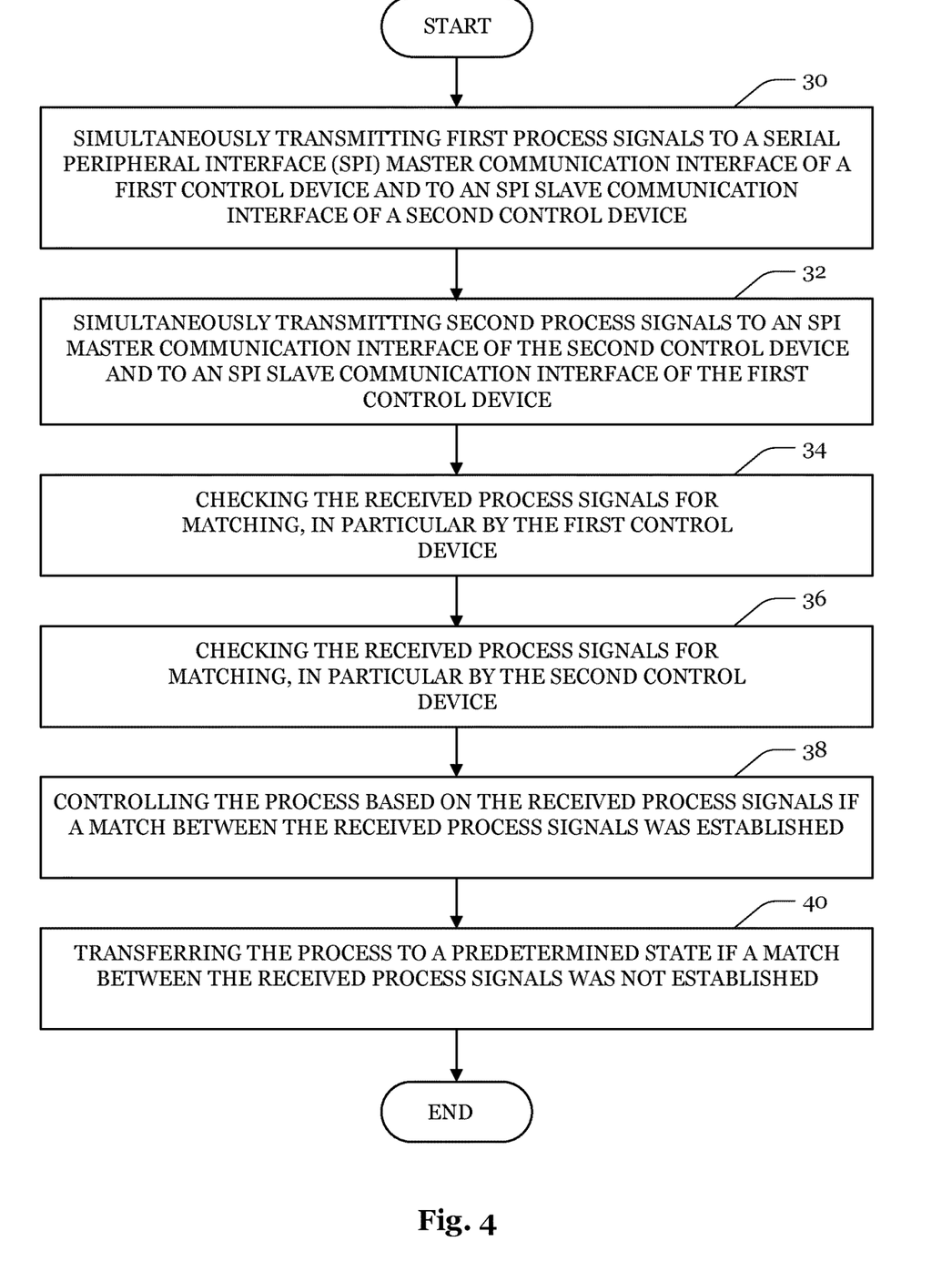
FIG. 4 shows a flow chart of an exemplary method.

FIG. 4 shows a flowchart of an exemplary method. In step 30, first process signals D1 are simultaneously transmitted to serial peripheral interface (SPI) master communication interface S1 of first control device 12, and to SPI slave communication interface S4 of second control device 14.

In step 32, second process signals D2 are transmitted to SPI master communication interface S2 of second control device 14 and to SPI slave communication interface S3 of first control device 12.

In step 34, the received process signals are checked for matching, for example, by first control device 12 or higher-level controller 28.

In step 36, the received process signals are checked for matching, for example, by second control device 14 or higher-level controller 28.

In step 38, the process is controlled based on received process signals D1/D2 if a match between the received process signals was established.

In step 40, the process is transferred to a predetermined state if a match between the received process signals D1, D2 was not established.

As shown in FIGS. 1 to 3, the method is based on the fact that the two control devices 12, 14 operate independent serial interfaces S1, S2, which are used, for example, to control port expanders. For example, SPI interfaces S1, S2 can be used to control serial-to-parallel converters and also parallel-to-serial converters.

Control devices 12, 14 can sample the inputs by operating the serial synchronous interfaces and can also switch output control signals independently of one another. It is provided in this case that both control devices 12, 14 receive the I/O data simultaneously from the inputs and outputs (data from digital inputs, analog inputs, readback signals from outputs, etc.) while the input data D1, D2 are being read. This makes it possible to avoid the first cross-matching of input data D1, D2 via the cross-communication.

To optimize the software cycle times, the two control devices 12, 14 read the input data stream of the respective other I/O channel in addition to their own input data stream. Both control devices 12, 14 thus operate two interfaces. For example, a control device 12, 14 operates an SPI interface as the SPI master interface and a further SPI interface for "listening in" to the SPI interface of the other control device 12, 14 as an SPI slave.

In this way, both control devices 12, 14 receive the same two-channel database without an additional data exchange. The data synchronization between the two input data streams can furthermore take place immediately after the end of the data transmission in a memory (not shown) of the two control devices 12, 14. An additional transfer of the information via cross-communication before further processing, for example, by a safety-related protocol stack is not necessary.

Furthermore, one of the two input data streams can be read inverted. This can help, e.g., to detect short circuits between the data lines of the SPI interfaces. Furthermore, communication cycles for cross-communication are reduced, the reaction time, in particular the safety reaction time, is decreased, and simpler and slower control devices 12, 14 can be used.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system for controlling a process, the system comprising:
    a first control device that comprises a first processor designed for processing first data, and a first communication interface of a first communication unit designed for receiving the first data; and
    a second control device that comprises a second processor designed for processing second data, and a second communication interface of a second communication unit designed for receiving the second data, the first communication interface transmitting and receiving the first data via a first connection and the second communication interface transmitting and receiving the second data via a second connection,
    wherein the first communication unit comprises a third communication interface and the second communication unit comprises a fourth communication interface,
    wherein the third communication interface is connected to the second communication interface via a third connection and the first processor is designed to process or compare the second data received by the third communication interface and the first data received by the first communication interface,
    wherein the fourth communication interface is connected to the first communication interface via a fourth connection and the second processor is designed to process or compare the second data received by the second communication interface and the first data received by the fourth communication interface, and
    wherein the fourth connection of the second communication unit receives the first data by connecting to a connecting line of the first connection at a first connecting point outside of the first control device such that the first data is transmitted over the first connection and the fourth connection substantially simultaneously to the first communication unit and the second communication unit.

2. The system according to claim 1, wherein the processing by the first processor comprises comparing the first data with the second data, and
    wherein the processing by the first processor comprises forwarding the first data, the second data, or a comparison result to a control unit.

3. The system according to claim 1, wherein the processing by the second processor comprises comparing the first data with the second data, and
    wherein the processing by the second processor comprises forwarding the first data, the second data, or a comparison result to a control unit.

4. The system according to claim 1, wherein, if the second data received by the third communication interface match the first data received by the first communication interface, the first processor determines the first output data on the basis of the received first data and/or the received second data, and
    wherein, if the second data received by the second communication interface match the first data received by the first communication interface, the second processor determines the second output data based on the received first data and/or the received second data.

5. The system according to claim 4, wherein the system compares the first output data and the second output data, and
    wherein, if the first output data and the second output data match, the system transmits the first output data and/or the second output data to a control unit, and
    wherein, if the first output data and the second output data do not match, the system transmits to the control unit an error signal or a third output data determined from non-matching first and second output data according to a logical or arithmetic operation.

6. The system according to claim 4, further comprising:
    a control unit,
    wherein the first control device is designed to transmit the first output data to the control unit,
    wherein the second control device is designed to transmit the second output data to the control unit, and
    wherein the control unit is designed to compare the first output data and the second output data and to discard the first output data and the second output data if the first output data and the second output data do not match.

7. The system according to claim 1, wherein the first communication interface and the second communication interface are designed as serial peripheral interface (SPI) master communication interfaces, and wherein the third communication interface and the fourth communication interface are designed as SPI slave communication interfaces, at least one first line of the fourth connection connecting the first communication interface to the fourth communication interface, at least one second line of the third connection connecting the second communication interface to the third communication interface.

8. The system according to claim 1, wherein the first connection includes four first connecting lines, at least two of the four first connecting lines being signal lines, the at least two signal lines including the connecting line,
    wherein the second connection includes four second connecting lines, at least two of the four second connecting lines being signal lines.

9. The system according to claim 8, wherein the third connection includes two third connecting lines and connects to at least two of the four second connecting lines of the second communication interface, wherein the fourth connection includes two fourth connecting lines and connects to at least two of the four second connecting lines of the second communication interface.

10. The system according to claim 1, wherein the first connection includes four first connecting lines, one of the four first connecting lines being a clock signal line and two of the four first connecting lines being signal lines,
wherein the second connection includes four second connecting lines, one of the four second connecting lines being a clock signal line and two of the four second connecting lines being signal lines.

11. The system according to claim 1, wherein the first data is transmitted over the first communication interface substantially simultaneously with the second data being transmitted over the second communication interface.

12. The system according to claim 1, wherein the first connection, the second connection, the third connection, and the fourth connection each comprise two lines.

13. The system according to claim 1, wherein the third connection of the first communication unit receives the second data by connecting to another connecting line of the second connection at a second connecting point outside of the second control device such that the second data is transmitted over the second connection and the third connection substantially simultaneously to the first communication unit and the second communication unit.

14. A method for controlling a process, the method comprising:
substantially simultaneously transmitting first process signals to a serial peripheral interface master communication interface of a first control device via a first line connection and to an SPI slave communication interface of a second control device via a second line connection;
substantially simultaneously transmitting second process signals to an SPI master communication interface of the second control device via a third line connection and to an SPI slave communication interface of the first control device via a fourth line connection;
checking the received first and second process signals for matching by the first control device;
checking the received first and second process signals for matching by the second control device;
controlling the process based on the received first and second process signals if a match between the received process signals was established; and
transferring the process to a predetermined state if the match between the received first and second process signals was not established,
wherein receiving the first process signals by the second control device comprises listening via the second line connection to the communication of the SPI master communication interface of the first control device by the SRI slave communication interface of the second control device,
wherein receiving the second process signals by the first control device comprises listening to the communication of the SPI master communication interface via the fourth line connection of the second control device by the SPI slave communication interface of the first control device.

15. The method according to claim 14,
wherein the second line connection connects to a first master signal line between the first control device and a first I/O unit, and
wherein the fourth line connection connects to a second master signal line between the second control device and a second I/O unit.

16. The method according to claim 14, wherein transmitting the first process signals to the SPI slave communication interface of the second control device comprises modifying and inverting the first process signals.

17. The method according to claim 16, further comprising:
checking, by the second control device, the modified first process signals and the second process signals for matching; and
transferring the process to a predetermined state if the second control device establishes a match between the modified first process signals and the second process signals.

18. The method according to claim 14, further comprising:
deriving process data from the received first and second process signals;
determining control data, based on the process data, by the first control device and the second control device;
performing a cross-comparison with respect to the control data of the first control device and the second control device;
deriving control signals from the control data; and
outputting the control signals.

19. The method according to claim 14, wherein the first line connection and the third line connections include four connecting lines, and wherein the second line connection and the fourth line connection include two connecting lines.

* * * * *